(12) United States Patent
Wilson

(10) Patent No.: US 7,082,318 B2
(45) Date of Patent: Jul. 25, 2006

(54) ELECTRONIC DEVICE

(75) Inventor: Simon Wilson, Reading (GB)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 10/015,617

(22) Filed: Dec. 17, 2001

(65) Prior Publication Data

US 2003/0114184 A1 Jun. 19, 2003

(51) Int. Cl.
*H04M 1/00* (2006.01)

(52) U.S. Cl. .............................. 455/550.1; 455/575.1; 455/90.3; 455/575.3

(58) Field of Classification Search ................ 455/550, 455/569.1, 90.1, 566, 550.1, 575.1, 90.3; 379/33.13, 90, 575
See application file for complete search history.

(56) References Cited

U.S. PATENT DOCUMENTS 4,771,927 A * 9/1988 Ventura ...................... 224/666
5,394,913 A * 3/1995 Zezza et al. ................. 150/146
6,115,620 A * 9/2000 Colonna et al. .......... 455/569.1
6,272,324 B1 * 8/2001 Rudisill et al. ........... 455/575.8
6,360,104 B1 * 3/2002 Budd et al. ................. 455/566
6,363,244 B1 * 3/2002 McGhee .................... 455/90.1

FOREIGN PATENT DOCUMENTS

JP 10190796 A * 7/1998
JP 410190796 A * 7/1998

* cited by examiner

*Primary Examiner*—Quochien B. Vuong
*Assistant Examiner*—Tan Trinh
(74) *Attorney, Agent, or Firm*—Alston & Bird LLP

(57) ABSTRACT

An electronic device including a housing (2,3) and a cover (4) connected by a flexible member (5) about which the cover (4) may pivot with respect to the housing (2,3) between an open and closed position, the housing (2,3) and the cover (4) also being connected by a flexible resilient strap (30) configured to bias the cover (4) into the open position in which the covet (4) extends away from the housing (2,3). The electronic device is preferably a mobile telephone.

20 Claims, 3 Drawing Sheets

ELECTRONIC DEVICE

FIELD OF THE INVENTION

The present invention relates to the field of electronic devices. In particular, the electronic device to which the invention relates is a mobile telecommunications device such as mobile telephone that incorporates a hinged cover. However, it could also relate to other electronic devices such as a personal data assistant (PDA). For ease of understanding, the present invention will be described in its application to a mobile telephone.

BACKGROUND TO THE INVENTION

Many mobile telephones incorporate a hinged cover that overlies the keypad when the telephone is not in use. The cover protects the keypad and prevents inadvertent activation of a key. The step of opening the cover to access the keys often also performs the function of switching the telephone on or at least illuminates the keys and the display so that the telephone is immediately ready for use. The microphone may also be incorporated in the cover so that it is positioned closer to the mouth when the phone is held against the head. A mobile telephone of this type is commonly referred to as a "flip" phone.

A disadvantage with conventional flip phones is that the hinge connecting the cover to the phone is a weak point that is susceptible to breakage. For example, if the telephone is dropped or the cover folded back too far, the hinge can break and the cover can become detached from the phone. If the microphone is situated in the cover, the telephone is then rendered useless as the connection between the control circuitry and the microphone is also broken. Furthermore, the hinge has a relatively complicated construction and is difficult to assemble and manufacture. The hinge region of the telephone is also aesthetically complicated and so looks untidy when the cover is open.

It has recently become desirable to provide a mobile telephone incorporating a fabric covered casing. A conventional flip phone is not generally suited to being fabric covered because the fabric tends to crease or ruck when the cover is opened.

SUMMARY OF THE INVENTION

It is an object of the present invention to overcome or substantially alleviate the problems and disadvantages with a conventional electronic device such as those described above.

According to the present invention, there is provided an electronic device including a housing and a cover connected by a flexible member about which the cover may pivot with respect to the housing between an open and closed position, the housing and the cover also being connected by a flexible resilient strap configured to bias the cover into the open position in which the cover extends away from the housing. As well as biasing or spring loading the covet into the open position, the region between the cover and the housing has a substantially improved aesthetic appearance both when the telephone is in the open and closed position. Furthermore, when a fabric covered housing is used, the material does not crease and instead remains tight to the surface of the housing when the cover is opened as the straps do not alter in length.

In a preferred embodiment, the electronic device comprises two flexible resilient straps. These may be positioned side by side and spaced from each other.

Preferably, the or each strap has one end attached to the outside of the cover and another end attached to the outside of the housing.

The or each strap may be a planar element. However, in a preferred embodiment, the or each strap has an embossed region to increase its strength and rigidity when the cover is in the open position.

Preferably, the or each strap is made of metal. However, it could also be formed from another resilient, flexible moulded material.

The flexible member is preferably made of rubber. The flexible member limits sideways movement of the cover relative to the housing and prevents it from twisting.

Advantageously, the electronic device of the present invention is a mobile telecommunications device such as a mobile telephone.

DETAILED DESCRIPTION OF A PREFERRED EMBODIMENT

An embodiment of the invention will now be described, by way of example only, with reference to the accompanying drawings.

Figure 1:
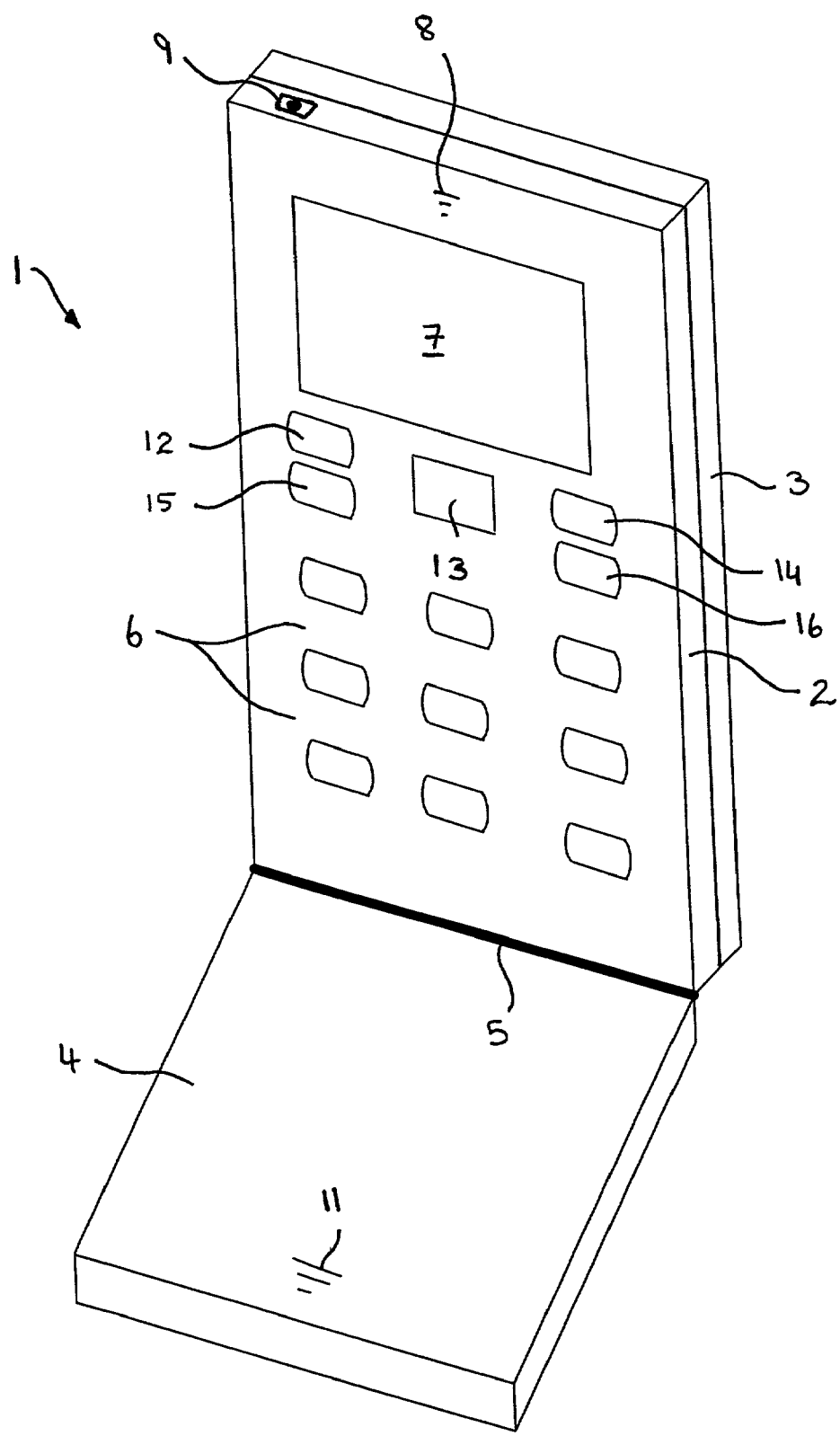
FIG. 1 shows a mobile telephone according to a preferred embodiment of the present invention.

The preferred electronic device to which this invention is applicable is a mobile telephone of the "flip" type such as that illustrated in FIG. 1. The telephone 1 has a front casing portion 2, a rear casing portion 3 and a cover 4 pivotally connected to the front casing portion 2 which is movable between a closed position in which it overlies the casing 2 and an open position in which it extends away from the front casing portion 2 at an angle of approximately 130 degrees. The angle to which the cover 4 extends relative to the casing 2 is dependent on the length of a flexible member 5, formed from a strip of rubber or polymer material joining the front casing 2 to the cover 4. In FIG. 1, the cover 4 is shown in an almost completely open position. A user interface is provided in the front casing portion 2 and comprises a key pad 6, an electronic display 7, an ear-piece 8, an on/off key 9. A microphone 11 is fitted in the cover 4. The telephone 1 is adapted to enable communication via a wireless telecommunications network, e.g. a cellular network. However, the telephone 1 could also be designed for a cordless network.

The key pad 6 has a first group of keys that are alphanumeric to enable a user to enter a telephone number, write a text message (SMS) or enter a name associated with a particular number, etc. The keypad 6 additionally includes five soft keys 12,13,14,15,16. The first soft key 12 is used to access the menu structure and to select a function in the menu. Its function changes depending on the status of the telephone 1. The second soft key 13 is used to scroll up and down in the display 7 whilst a menu is displayed. The third soft key 14 is used to enter the phonebook options when the telephone 1 is in a standby position. However, when in the menu structure, the third soft key 14 is used to close the menu structure or erase entered characters. The fourth and fifth soft keys 15,16 are call handling keys. The first call handling key 15 is used to start a call or establish a conference call and the second call handling key 16 is used to end a conference call or reject an incoming call.

Figure 2:
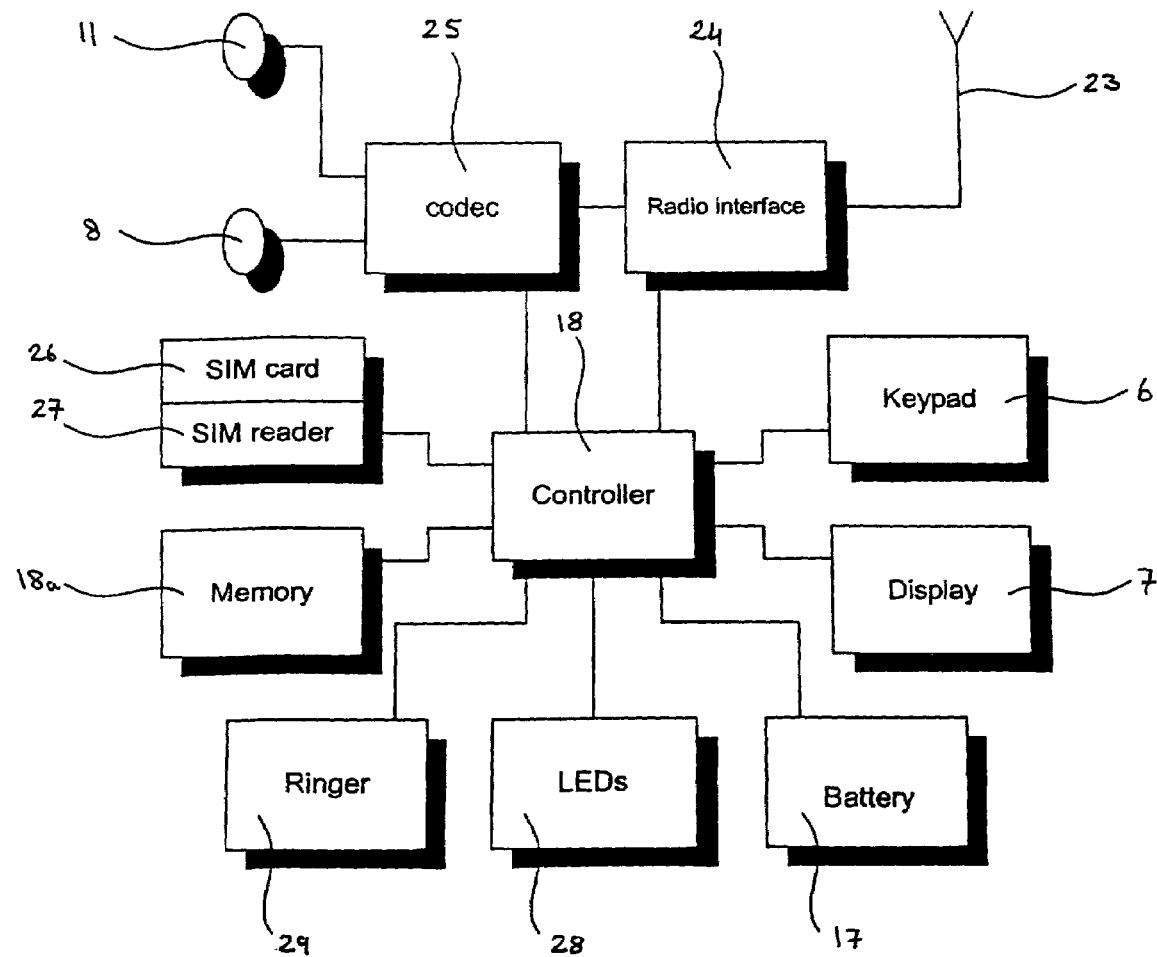
FIG. 2 shows a schematic representation of the electronic components of the mobile telephone illustrated in FIG. 1.

FIG. 2 shows a schematic representation of the main components of the mobile telephone illustrated in FIG. 1. The telephone 1 is powered by a removable battery pack 17. Signal processing is carried out under the control of a digital microcontroller 18 that has an associated RAM/ROM and flash memory 18a. Electric analogue signals are produced by microphone 11 and are fed to the ear-piece 8. The controller 18 receives instruction signals from the keypad 6 including the soft keys 12,13,14,15,16 and controls the operation of the display 7. Radio signals are transmitted and received by means of an antenna 23 connected through a radio interface 24 to a codec 25 configured to process signals under control of the controller 18. Thus, in use, for speech, the codec 25 receives analogue signals from the microphone 9, digitises them into a form suitable for transmission and feeds them to the radio interface 24 for transmission through antenna element 23 to the public land mobile network (PLMN). Similarly, received signals are fed to codec 25 so as to produce analogue signals that are fed to the ear-piece 8. The telephone 1 also includes a subscriber identification module (SIM) card 26, a SIM card reader 27, light emitting diodes (LEDs) 28 and a ringer 29. The individual circuits and elements are of a type well known in the art, for example, in the Nokia range of mobile telephones.

Figure 3:
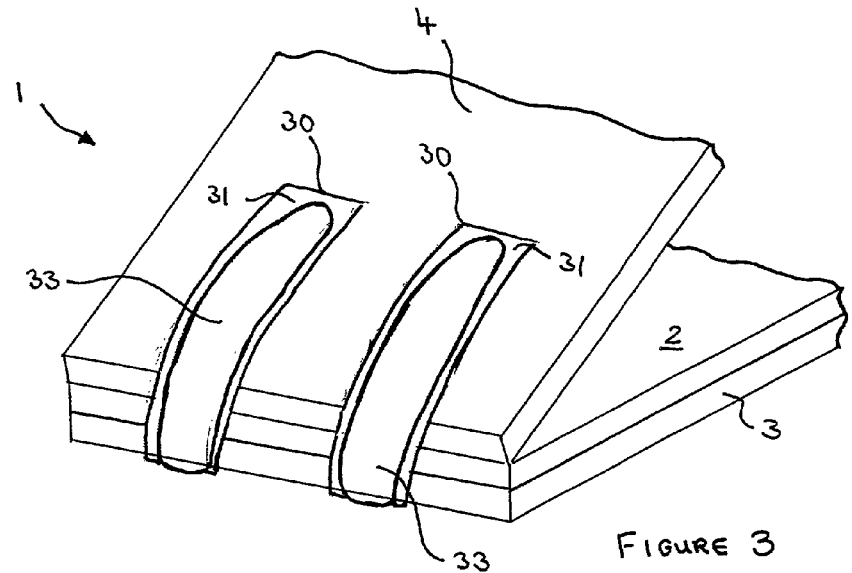
FIG. 3 shows a perspective view of a portion of the mobile telephone illustrated in FIG. 1.
Figure 4A:
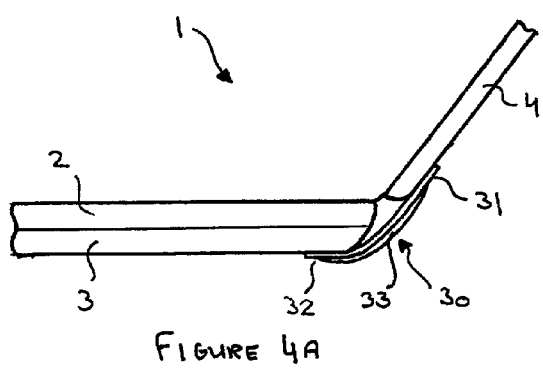
FIG. 4A shows a side elevation of a portion of the mobile telephone illustrated in FIG. 3 with the cover in an open position.
Figure 4B:
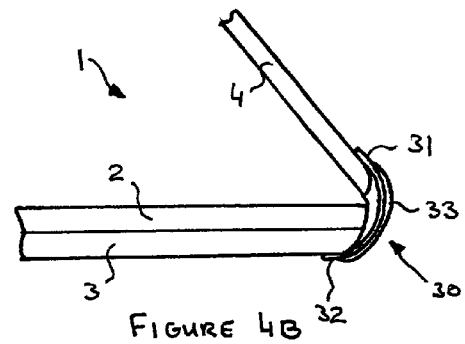
FIG. 4B shows a side elevation of a portion of the mobile telephone with the cover is a partially closed position.
Figure 4C:
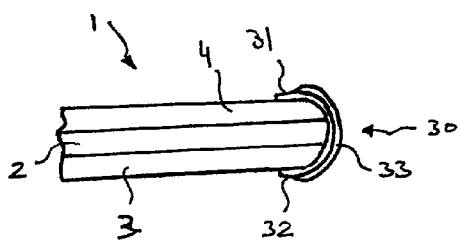
FIG. 4C shows a side elevation of a portion of the mobile telephone with the cover in a closed position.
Figure 4D:
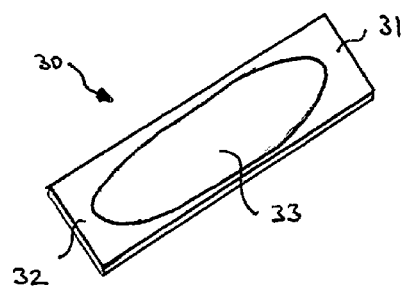
FIG. 4D shows a perspective view of the flexible resilient strap.

Referring now to FIG. 3, a perspective view of a portion of the rear of the mobile telephone illustrated in FIG. 1 can be seen and FIGS. 4A to 4C shows further views of the telephone illustrated in FIG. 3. A pair of resilient elongate flexible straps 30 extend over the outside of the telephone 1, each having one end 31 attached to the outside of the cover 4 and another end 32 attached to the rear surface of the rear casing portion 3. Each strap 30 is generally rectangular in shape and has a central substantially oval embossed or depressed region 33 to provide additional strength and rigidity thereto.

The straps 30 are made of metal such as steel. When the cover 4 is in the closed position, the straps 30 are resiliently deformed into a curved shape, as most clearly seen in FIG. 4A. When the cover is released, the resilience of the straps 30 urges the cover 4 into the open position. A catch mechanism of known type (not shown) may be used to lock the cover 4 in the closed position, the cover 4 pivoting into its open position in response to the catch being released.

It will be appreciated that the straps 30 also control the angle to which the cover 4 may open. Generally, an angle between the cover and the housing of 130 degrees is preferred.

Many modifications and variations to the preferred embodiments falling within the scope of the appended claims will be apparent to those skilled in the art. For example, whilst the invention has been described in relation to a mobile telephone, it can also be used in other electronic apparatus such as personal data assistants (PDAs).

The invention claimed is:

1. An electronic device comprising a housing and a cover connected by a hinge, the hinge comprising a flexible pivot member about which the cover may pivot with respect to the housing between an open and a closed position of the electronic device, the housing and the cover also being interconnected by at least one resilient biasing strap, wherein the at least one biasing strap is configured to bias the cover into the open position in which the cover extends away from the housing, and wherein the at least on biasing strap is made from a material which does not change length when the cover is opened.

2. An electronic device according to claim 1, including a catch for locking the cover in the dosed position in which it overlies a portion of the housing.

3. An electronic device according to claim 2, comprising two flexible resilient straps.

4. An electronic device according to claim 3, wherein each strap has one end attached to the outside of the cover and another end attached to the outside of the housing.

5. An electronic device according to claim 4, wherein each strap is a planar element.

6. An electronic device according to claim 5 wherein:
the hinge comprises a strip of rubber or polymer material.

7. An electronic device according to claim 4, wherein each strap has an embossed region.

8. An electronic device according to claim 7, wherein each strap is made of metal.

9. An electronic device according to claim 8 wherein:
the hinge comprises a strip of rubber or polymer material.

10. An electronic device according to claim 7 wherein:
the hinge comprises a strip of rubber or polymer material.

11. An electronic device according to claim 4 wherein:
the hinge comprises a strip of rubber or polymer material.

12. An electronic device according to claim 3 wherein:
the hinge comprises a strip of rubber or polymer material.

13. An electronic device according to claim 2 wherein:
the hinge comprises a strip of rubber or polymer material.

14. An electronic device according to claim 1 wherein the flexible pivot member is made of rubber.

15. An electronic device according to claim 14 wherein:
the hinge comprises a strip of rubber or polymer material.

16. An electronic device according to claim 1, wherein the electronic device comprises a mobile telecommunications device.

17. An electronic device according to claim 16, wherein the mobile telecommunications device comprises a mobile telephone.

18. An electronic device according to claim 1, wherein the electronic device is covered in fabric.

19. An electronic device according to claim 1, wherein the flexible pivot member extends between the housing and the cover.

20. An electronic device according to claim 1 wherein:
the hinge comprises a strip of rubber or polymer material.

* * * * *